US012568270B2

(12) United States Patent
Zheng

(10) Patent No.: US 12,568,270 B2
(45) Date of Patent: Mar. 3, 2026

(54) ELEMENT DISPLAY METHOD AND APPARATUS, ELEMENT SELECTION METHOD AND APPARATUS, DEVICE, AND STORAGE MEDIUM

(71) Applicant: Tencent Technology (Shenzhen) Company Limited, Shenzhen (CN)

(72) Inventor: Shuyuan Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 300 days.

(21) Appl. No.: 18/139,932

(22) Filed: Apr. 26, 2023

(65) Prior Publication Data

US 2023/0362429 A1 Nov. 9, 2023

Related U.S. Application Data

(63) Continuation of application No. PCT/CN2022/115721, filed on Aug. 30, 2022.

(30) Foreign Application Priority Data

Sep. 29, 2021 (CN) .......................... 202111153004.X

(51) Int. Cl.
*H04N 21/431* (2011.01)
*H04N 21/4784* (2011.01)
(52) U.S. Cl.
CPC ..... *H04N 21/4312* (2013.01); *H04N 21/4784* (2013.01)
(58) Field of Classification Search
CPC .......... H04N 21/4312; H04N 21/4784; H04N 21/4756; G06F 3/1407; G06F 9/451
See application file for complete search history.

(56) References Cited

U.S. PATENT DOCUMENTS

| | | | | |
|---|---|---|---|---|
| 2017/0031559 A1* | 2/2017 | Lee | ........................... | G06F 3/14 |
| 2017/0243385 A1* | 8/2017 | Mitsugi | ................... | G09F 9/372 |

(Continued)

FOREIGN PATENT DOCUMENTS

| | | |
|---|---|---|
| CN | 108924662 A | 11/2018 |
| CN | 113778365 A | 12/2021 |
| JP | 2016157448 A | 9/2016 |

OTHER PUBLICATIONS

Tencent Technology, ISR, PCT/CN2022/115721, Nov. 16, 2022, 2 pgs.

(Continued)

*Primary Examiner* — John W Miller
*Assistant Examiner* — Akshay Doshi
(74) *Attorney, Agent, or Firm* — Morgan, Lewis & Bockius LLP

(57) ABSTRACT

A method for displaying a feedback element is performed by a computer device. The method includes: displaying a content presentation interface, the content presentation interface including a target media content; in response to a first attitude operation for the target media content, determining attribute information of the first attitude operation; based on the attribute information of the first attitude operation, obtaining a first feedback element corresponding to the first attitude operation, the first feedback element comprising at least one feedback element uniquely selected from a material pool corresponding to a first attribute level, and the first attribute level referring to an attribute level corresponding to the attribute information of the first attitude operation; and displaying the first feedback element. The technical solutions of this application can improve the richness of display modes of feedback elements corresponding to attitude operations.

20 Claims, 8 Drawing Sheets

(56)                    References Cited

U.S. PATENT DOCUMENTS

| | | | | |
|---|---|---|---|---|
| 2021/0399911 A1* | 12/2021 | Jorasch | ............... | H04L 12/1818 |
| 2022/0038580 A1* | 2/2022 | Li | ........................ | H04L 12/1818 |
| 2022/0277055 A1* | 9/2022 | You | ......................... | G06F 16/93 |
| 2022/0353220 A1* | 11/2022 | Balaji | ................. | H04L 12/1831 |
| 2023/0007367 A1* | 1/2023 | Wang | ................. | H04N 21/4221 |

OTHER PUBLICATIONS

Tencent Technology, WO, PCT/CN2022/115721, Nov. 16, 2022, 6 pgs.
Tencent Technology, IPRP, PCT/CN2022/115721, Apr. 2, 2024, 5 pgs.
Tencent Technology, Japanese Office Action, JP Patent Application No. 2023-571570, Oct. 10, 2024, 10 pgs.

* cited by examiner

<u>10</u>

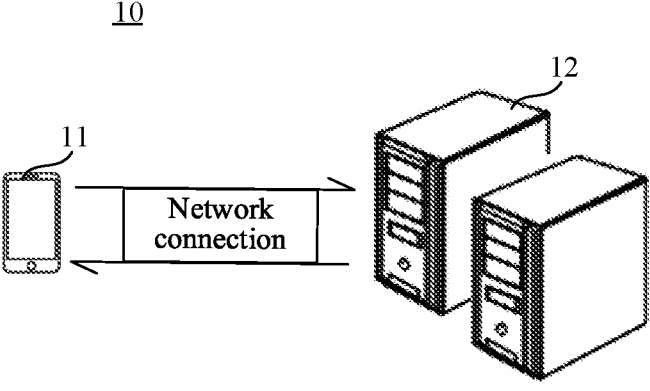

FIG. 1

| | |
|---|---|
| Display a content presentation interface, a target media content being displayed in the content presentation interface | 201 |
| Determine, in response to a first attitude operation for the target media content, attribute information of the first attitude operation | 202 |
| Obtain, based on the attribute information of the first attitude operation, a first feedback element corresponding to the first attitude operation | 203 |
| Display the first feedback element | 204 |

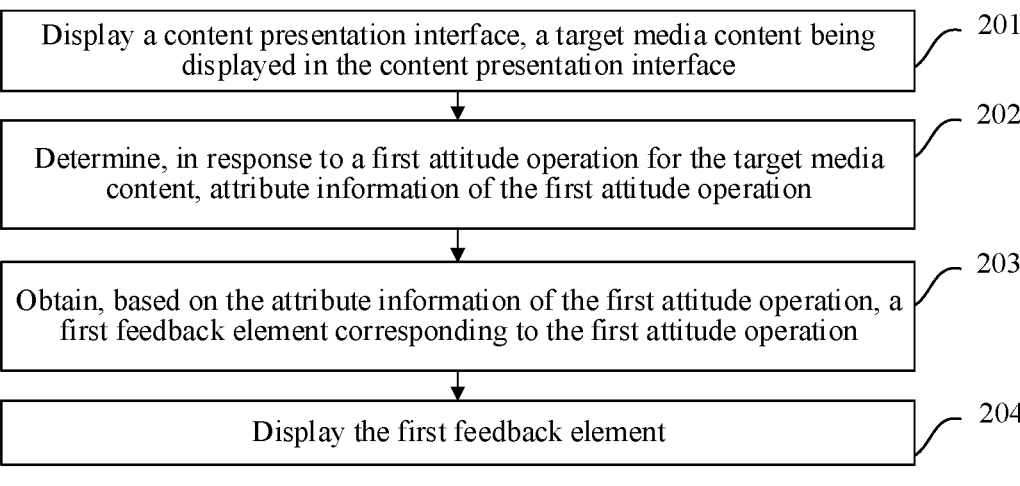

FIG. 2

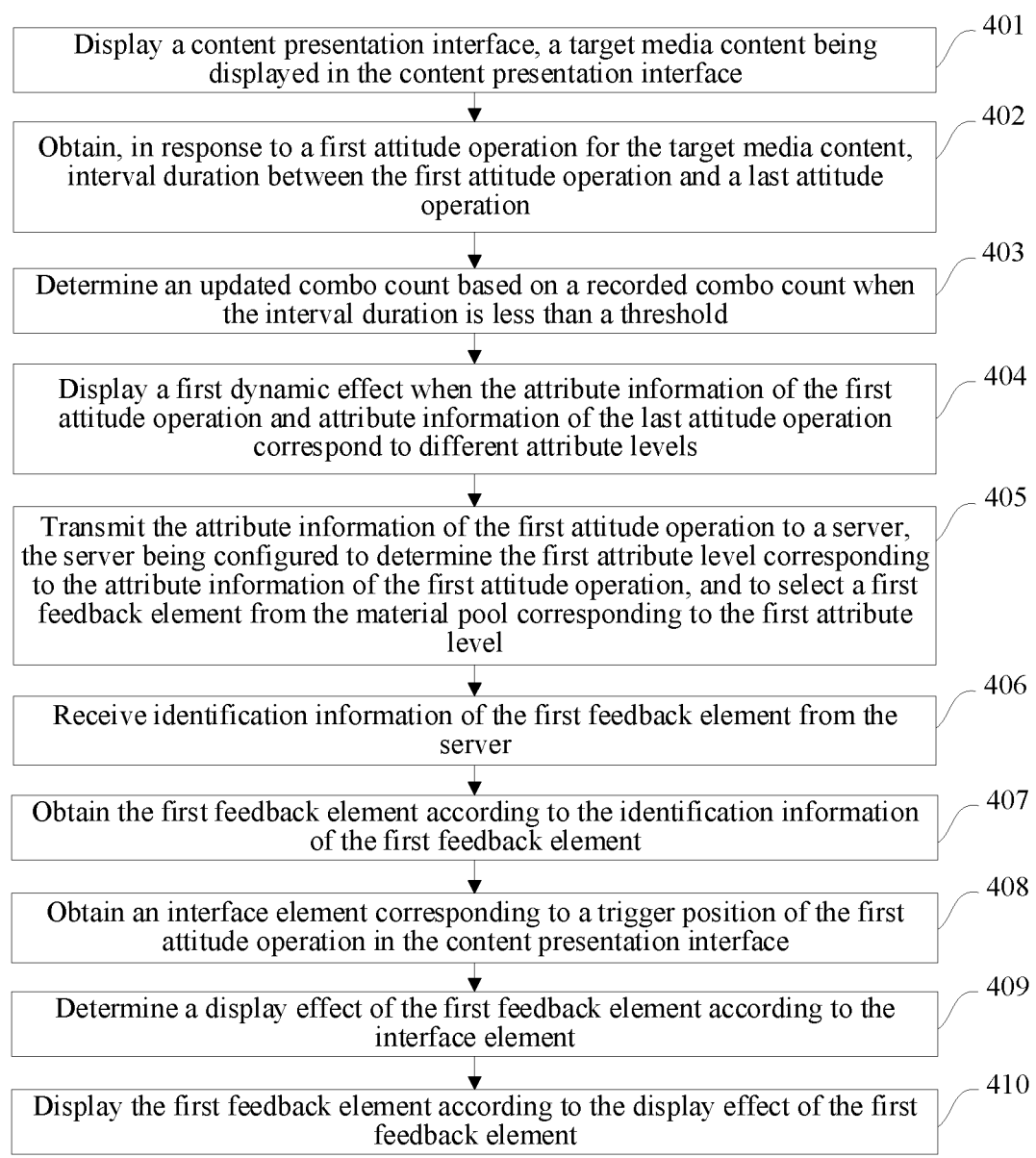

| Display a content presentation interface, a target media content being displayed in the content presentation interface | 401 |

Obtain, in response to a first attitude operation for the target media content, interval duration between the first attitude operation and a last attitude operation — 402

Determine an updated combo count based on a recorded combo count when the interval duration is less than a threshold — 403

Display a first dynamic effect when the attribute information of the first attitude operation and attribute information of the last attitude operation correspond to different attribute levels — 404

Transmit the attribute information of the first attitude operation to a server, the server being configured to determine the first attribute level corresponding to the attribute information of the first attitude operation, and to select a first feedback element from the material pool corresponding to the first attribute level — 405

Receive identification information of the first feedback element from the server — 406

Obtain the first feedback element according to the identification information of the first feedback element — 407

Obtain an interface element corresponding to a trigger position of the first attitude operation in the content presentation interface — 408

Determine a display effect of the first feedback element according to the interface element — 409

Display the first feedback element according to the display effect of the first feedback element — 410

ELEMENT DISPLAY METHOD AND APPARATUS, ELEMENT SELECTION METHOD AND APPARATUS, DEVICE, AND STORAGE MEDIUM

CROSS-REFERENCE TO RELATED APPLICATIONS

This application is a continuation application of PCT Patent Application No. PCT/CN2022/115721, entitled "ELEMENT DISPLAY METHOD AND APPARATUS, ELEMENT SELECTION METHOD AND APPARATUS, DEVICE, AND STORAGE MEDIUM" filed on Aug. 30, 2022, which claims priority to Chinese Patent Application No. 202111153004.X, entitled "ELEMENT DISPLAY METHOD AND APPARATUS, ELEMENT SELECTION METHOD AND APPARATUS, DEVICE, AND STORAGE MEDIUM" filed on Sep. 29, 2021, all of which is incorporated by reference in its entirety.

FIELD OF THE TECHNOLOGY

Embodiments of this application relate to the technical field of applications and displays, and in particular, to an element display method and apparatus, an element selection method and apparatus, a device, and a storage medium.

BACKGROUND OF THE DISCLOSURE

Livestreaming is a media content presentation mode capable of real-time acquisition and instant posting. During the livestreaming, livestreamers may obtain instant feedback information of users to livestreamed media content.

In the related art, livestreamed target media content may be presented through a content presentation interface. Users may perform a thumbs-up operation through the content presentation interface so as to represent the like for the target media content. A feedback element corresponding to the thumbs-up operation will also be displayed in the content presentation interface.

In the related art, a display mode of the feedback element corresponding to the thumbs-up operation is relatively single.

SUMMARY

Embodiments of this application provide an element display method and apparatus, an element selection method and apparatus, a device, and a storage medium, which can improve the richness of display modes of feedback elements corresponding to attitude operations (such as a thumbs-up operation). The technical solutions are as follows.

According to one aspect of an embodiment of this application, a method for displaying a feedback element is performed by a terminal device. The method includes:

displaying a content presentation interface, the content presentation interface including a target media content;

in response to a first attitude operation for the target media content, determining attribute information of the first attitude operation;

based on the attribute information of the first attitude operation, obtaining a first feedback element corresponding to the first attitude operation, the first feedback element comprising at least one feedback element uniquely selected from a material pool corresponding to a first attribute level, and the first attribute level referring to an attribute level corresponding to the attribute information of the first attitude operation; and displaying the first feedback element.

According to one aspect of an embodiment of this application, a computer device is provided. The computer device includes a processor and a memory. The memory stores a computer program. The computer program is loaded and executed by the processor to implement the foregoing element display method or the foregoing feedback element selection method.

According to one aspect of an embodiment of this application, a non-transitory computer-readable storage medium is provided. The non-transitory computer-readable storage medium stores a computer program. The computer program is loaded and executed by a processor to implement the foregoing element display method or the foregoing feedback element selection method.

The technical solutions provided in the embodiments of this application may include the following beneficial effects.

After a first attitude operation is identified when a target media content is displayed, an attribute level of the first attitude operation is determined to be a first attribute level, and a feedback element corresponding to the first attitude operation is selected from a material pool corresponding to the first attribute level and displayed. That is, displayed feedback elements corresponding to attitude operations of different attribute levels are different, so as to improve the display richness of the feedback elements.

BRIEF DESCRIPTION OF THE DRAWINGS

FIG. 1 is a schematic diagram of an implementation environment according to an embodiment of this application.

FIG. 2 is a flowchart of an element display method according to an embodiment of this application.

FIG. 4 is a flowchart of an element display method according to another embodiment of this application.

DESCRIPTION OF EMBODIMENTS

Figure 3:
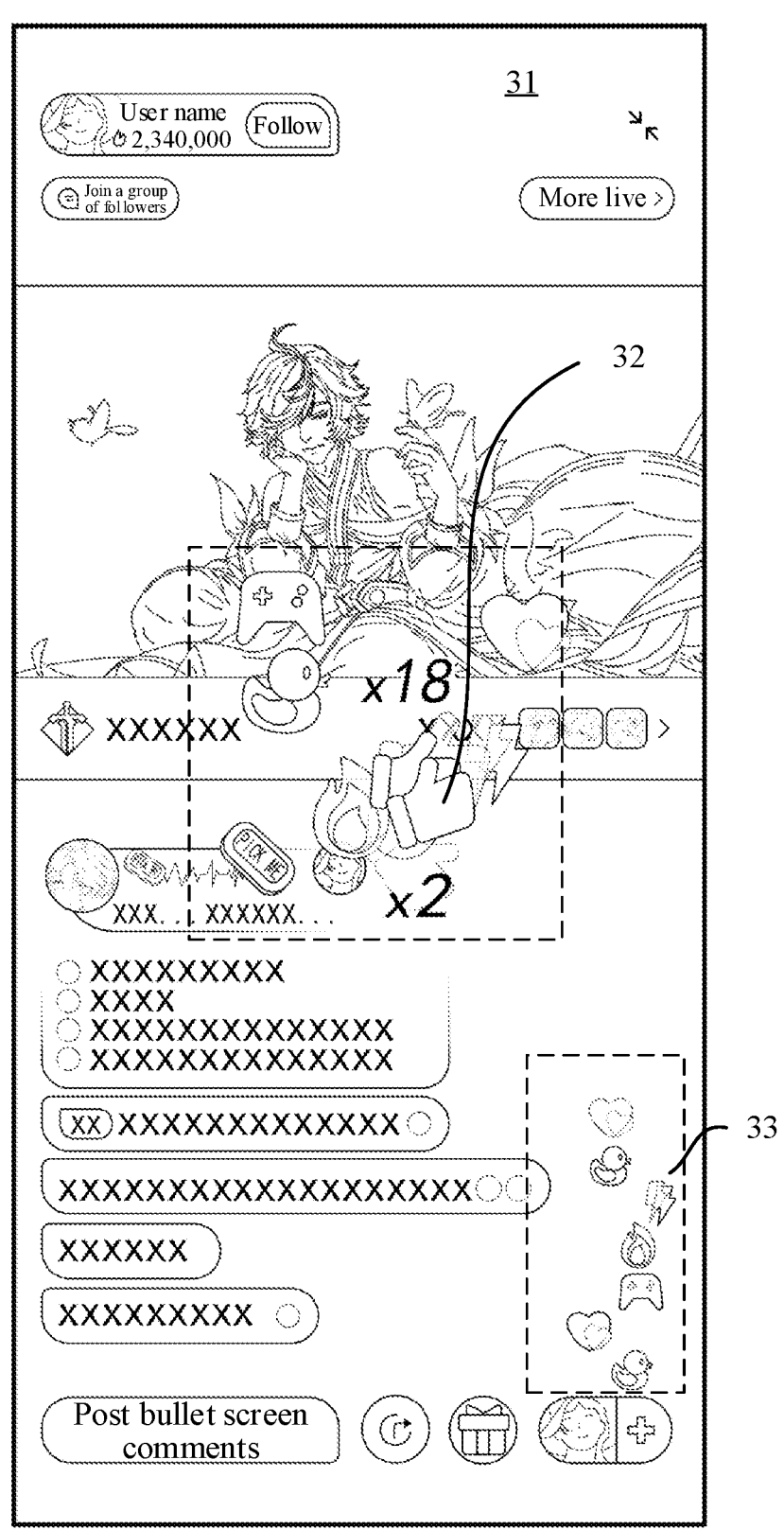
FIG. 3 is a schematic diagram of a content presentation interface according to an embodiment of this application.

Exemplary embodiments are described in detail herein, and examples of the exemplary embodiments are shown in the accompanying drawings.

FIG. 1 shows a schematic diagram of an implementation environment according to an embodiment of this application. The implementation environment may be implemented as an element display system. As shown in FIG. 1, the system 10 may include: a terminal device 11, hereinafter simply referred to as a terminal 11.

In some embodiments, a target application, such as a client of a target application, is installed and run in the terminal 11. In some embodiments, the client is logged in with a first user account. The terminal is an electronic device that has data computing, processing, and storage capabilities. The terminal may be a smartphone, a tablet computer, a personal computer (PC), a wearable device, or the like. This embodiment of this application is not limited thereto. The target application may be a livestreaming application, such as a video livestreaming application or an audio livestreaming application. This embodiment of this application is not limited thereto. The target application may also be any application having media content presentation and element display functions, such as a social application, a payment application, a video application, a music application, a shopping application, a gaming application, or a news application. An execution entity of each step of an element display method provided in this embodiment of this application may be the terminal 11, such as the client run in the terminal 11.

In some embodiments, the system 10 further includes a server 12. The server 12 establishes a communication connection (for example, a network connection) with the terminal 11. The server 12 is configured to provide background services for the target application. The server may be an independent physical server, may also be a server cluster or distributed system composed of multiple physical servers, and may also be a cloud server providing cloud computing services.

An element selection method provided in this embodiment of this application may be performed by the client in the terminal 11, or performed by the server 12, or performed interactively by the client in the terminal 11 and the server 12. This embodiment of this application is not specifically limited thereto.

The technical solutions provided in this embodiment of this application may be applied to a presentation scene of media content, such as a video playing scene, an audio playing scene, or an image-text presentation scene (for example, a presentation scene for news information, posts, articles, and the like). In some embodiments, the technical solutions provided in this embodiment of this application may also be applied to livestreaming scenes of various media contents, such as a video livestreaming scene, an audio livestreaming scene, or an image-text livestreaming scene. This embodiment of this application is not specifically limited thereto.

The technical solutions of this application are described below with reference to several embodiments.

FIG. 2 shows a flowchart of an element display method according to an embodiment of this application. In this embodiment, the method is illustrated by being applied to the client described above. The method may include the following steps (201-204):

Step 201: Display a content presentation interface, a target media content being displayed in the content presentation interface.

In some embodiments, the target media content is a macroscopic media content, such as a video content or an image-text content (the image-text content including at least one of an image content and a text content), and the target media content may be displayed directly in the content presentation interface.

In some embodiments, the target media content is an audio content, and the audio content is played and presented by the terminal where the client is located, but playing parameters of the audio content may be controlled through the content presentation interface to control playing effects thereof, for example, controlling a playing volume, playing progress, playing speed, and the like of the audio content. In some embodiments, the content presentation interface displays information related to the audio content, such as a text content corresponding to the audio content, an author of the audio content, or topic information of the audio content.

Step 202: Determine, in response to a first attitude operation for the target media content, attribute information of the first attitude operation.

Different attribute levels correspond to different material pools. The material pool includes at least one feedback element.

In some embodiments, the client identifies an operation for the target media content as a first attitude operation. The first attitude operation represents that an attitude of a user towards the target media content is a target attitude. The target attitude may be thumbs-up, like, sympathy, anger, encouragement, comfort, recommendation, thumbs-down, dislike, non-recommendation, or the like. For example, when the target attitude is thumbs-up, like or recommendation, the first attitude operation may be referred to as a first thumbs-up operation (or a first like operation). When the target attitude is thumbs-down, dislike or non-recommendation, the first attitude operation may be referred to as a first thumbs-down operation. This embodiment of this application is mainly illustrated with the first attitude operation being the first thumbs-up operation, and is not limited thereto.

In some embodiments, the first attitude operation may be a click operation, a slide operation, a long-press operation, a shake operation, or the like.

In some embodiments, the client may receive the first attitude operation of the user towards the target media content through the content presentation interface. In some embodiments, taking thumbs-up as an example, the content presentation interface includes a thumbs-up control, and the user may trigger the thumbs-up control by clicking and sliding the thumbs-up control so as to realize a thumbs-up operation. In some embodiments, the content presentation interface includes a thumbs-up response region for the thumbs-up operation, and the user may realize the thumbs-up operation by clicking and sliding the thumbs-up response region. In some embodiments, the thumbs-up response region is a region not displaying other controls in the content presentation interface. For example, the content presentation interface includes an exit control for closing or stopping presenting the target media content, and a region occupied by the exit control in the content presentation interface does not belong to the thumbs-up response region. For another example, the content presentation interface includes a message presentation region. By clicking a message in the message presentation region, a detailed content of the message may be viewed, information such as a user identity document (ID) sending the message may be viewed, and a reply to the message may be given. The message presentation region does not belong to the thumbs-up response region.

In some embodiments, the material pool refers to a set of at least one feedback element, or a set of identifiers of at least one feedback element. Different material pools may be located in different storage directories, or in identifiers of feedback elements in the same material pool. The same identifier field is present for distinguishing from feedback elements in other material pools.

In some embodiments, different material pools include different feedback elements. That is, the same feedback element exists in only one material pool, and the same feedback element will not exist in two different material pools. Therefore, feedback elements displayed at different attribute levels need to be different.

In some embodiments, the feedback element may include at least one of an image element, a text element, and a video element. In some embodiments, the first thumbs-up operation represents that the attitude of the user towards the target media content is a supportive attitude such as thumbs-up, like or recommendation, and the corresponding feedback element may also include elements indicating positive, nice, and thumbs-up, such as thumbs-up gestures, hearts, flowers, or fireworks. In some embodiments, the feedback element may also be an audio element, such as cheers. For another example, the first thumbs-down operation represents that the attitude of the user towards the target media content is a non-supportive attitude such as thumbs-down, dislike or non-recommendation, and the corresponding feedback element may also include elements indicating negative comments, non-recommendation and dislike, such as crying faces and down thumbs.

In some embodiments, the attribute information may indicate or determine an attribute level to which the attribute information corresponds, and different attribute information may correspond to different attribute levels. The client identifies a first attitude operation for the target media content, determines attribute information of the first attitude operation for determining an attribute level corresponding to the first attitude operation, and then determines a material pool corresponding to the first attitude operation.

Step 203: Obtain, based on the attribute information of the first attitude operation, a first feedback element corresponding to the first attitude operation.

In some embodiments, the first feedback element includes at least one feedback element uniquely selected from a material pool corresponding to a first attribute level, and the first attribute level refers to an attribute level corresponding to the attribute information of the first attitude operation.

In some embodiments, the client transmits the attribute information of the first attitude operation to a server and obtains a first feedback element from the server.

Step 204: Display the first feedback element.

In some embodiments, after obtaining the first feedback element, the first feedback element is displayed in the content presentation interface to feedback that the first attitude operation is successfully identified. In some embodiments, a time interval between the client identifying the first attitude operation and displaying the first feedback element is less than a time interval threshold. Since attitude operations are mostly click operations, a time interval between the adjacent click operations may be short, and therefore the time of the time interval threshold may also be set as short duration. The time interval threshold may be 0.0001 seconds (s), 0.0003 s, 0.0005 s, 0.003 s, 0.006 s, 0.01 s, 0.03 s, or the like. The time interval threshold may be set by a person skilled in the art according to actual situations. This embodiment of this application is not specifically limited thereto.

In some embodiments, if the first feedback element remains unsuccessfully displayed in the content presentation interface within a threshold time interval after the client identifies the first attitude operation, the feedback element corresponding to the first attitude operation is no longer displayed so as not to delay the display too long to mislead the user.

In some embodiments, as the attribute level is higher, the corresponding feedback element is richer and/or more complex (also understood to be more advanced). For example, as the attribute level is higher, the size of the feedback element displayed correspondingly is larger. Or, as the attribute level is higher, the color of the feedback element displayed correspondingly is richer.

In some embodiments, a target number of common feedback elements are displayed during the display of the target media content. The target number of common feedback elements are selected from a common material pool according to an attitude operation total of the target media content within a first time period. In some embodiments, as the attitude operation total of the target media content within the first time period is higher, the target number is larger.

In some embodiments, before the target number of common feedback elements are displayed, the method further includes: receiving identification information of the common feedback elements transmitted by the server; and obtaining the common feedback elements according to the identification information of the common feedback elements. In some embodiments, the common feedback elements may be stored in the terminal so as to be obtained and displayed directly from the terminal. In some embodiments, the common feedback elements transmitted by the server are directly received and displayed.

As shown in FIG. 3, a first feedback element 32 and a common feedback element 33 are displayed in a content presentation interface 31. Display regions of the first feedback element 32 and the common feedback element 33 may be different. Obviously, if the user does not perform the thumbs-up operation, only the common feedback element 33 is displayed instead of the first feedback element 32 in the content presentation interface. In some embodiments, there may also be a combo count corresponding to the first thumbs-up operation near the first feedback element 32. In some embodiments, display effects (such as color) of the combo counts corresponding to different attribute levels are different.

In summary, according to the technical solutions provided in this embodiment of this application, after a first attitude operation is identified when a target media content is displayed, an attribute level of the first attitude operation is determined to be a first attribute level, and a feedback element corresponding to the first attitude operation is selected from a material pool corresponding to the first attribute level and displayed. That is, displayed feedback elements corresponding to attitude operations of different attribute levels are different, so as to improve the display richness of the feedback elements.

Since attitude operations of different attribute levels correspondingly display different feedback elements, a user can view different types of feedback elements by performing multiple attitude operations, so as to avoid or reduce the aesthetic fatigue of the user on the same feedback element. In addition, in this way, it is possible to improve the enthusiasm of the user to perform the attitude operations by explicit and clear positive feedbacks on the attitude operations of different attribute levels through different feedback elements.

FIG. 4 shows a flowchart of an element display method according to another embodiment of this application. In this embodiment, the method is illustrated by being applied to the client described above. The method may include the following steps (401-410):

Step 401: Display a content presentation interface, a target media content being displayed in the content presentation interface.

Step 401 is identical or similar to step 301 in the embodiment of FIG. 3, and is not described herein again.

Step 402: Obtain, in response to a first attitude operation for the target media content, interval duration between the first attitude operation and a last attitude operation.

In some embodiments, the interval duration between the first attitude operation and the last attitude operation is obtained through stored historical record information after the client identifies the first attitude operation for the target media content. In some embodiments, the historical record information may be stored in the terminal where the client is located, or may be stored in the foregoing server. This embodiment of this application is not specifically limited thereto. In some embodiments, if information related to the last attitude operation is not obtained from the historical record information, the first attitude operation is determined as an attitude operation for the first time. The reason why the information related to the last attitude operation cannot be obtained from the historical operation information may be that the client does not identify an attitude operation before the first attitude operation, or that the information related to the last attitude operation has been deleted or is unreadable.

Step 403: Determine an updated combo count based on a recorded combo count when the interval duration is less than a threshold.

In some embodiments, the attribute information includes a combo count. The attribute information of the first attitude operation includes the updated combo count.

In some embodiments, if the interval duration is less than the threshold, it indicates that the interval duration between the first attitude operation and the last attitude operation is small, and it may be considered that the first attitude operation and the last attitude operation are consecutive attitude operations. Therefore, after the client identifies the first attitude operation, the updated combo count may be obtained.

In some embodiments, the attitude operation is a click operation, and the combo count is the number of consecutive click operations.

In some embodiments, in response to a second attitude operation for the target media content, a combo count of the second attitude operation is determined according to a target increment when a combo count of the first attitude operation is greater than or equal to a threshold. The target increment is greater than a default increment of attitude operations. That is, if the combo count of the first attitude operation is greater than or equal to the threshold, it indicates that the user has continuously performed a larger number of attitude operations. In order to encourage the user to continue the consecutive attitude operations, the increased combo count corresponding to the subsequent attitude operations may be increased. For example, the attitude operation is a click operation, and the default increment of the attitude operation is 1. That is, the combo count of the attitude operation is increased by 1 every click. When the combo count of the first attitude operation is greater than or equal to the threshold, the target increment of the subsequent second attitude operation may be set as 2. That is, after the first attitude operation, the corresponding combo count is increased by 2 every click, thereby simplifying the user operation, reducing the number of identifications of a terminal device for the attitude operation, reducing the processing overhead of the terminal device, and also contributing to improvement of the enthusiasm of the user for continuing the attitude operation.

In some embodiments, when the combo count of the first attitude operation is greater than or equal to the threshold, the combo count is automatically increased, and the combo count stops being automatically increased upon generation or obtaining of a termination instruction. Illustratively, when the first attitude operation is the first thumbs-up operation, the termination instruction is a thumbs-up termination instruction. When the first attitude operation is the first thumbs-down operation, the termination instruction is a thumbs-down termination instruction. In this embodiment, when the combo count of the first attitude operation is greater than or equal to the threshold, it may be considered that the combo count is relatively high and the user is relatively tired. Within a certain time period thereafter, the user does not need to continue the attitude operation, and the combo count will also continue to increase, thereby giving a certain rest time to the user without interrupting the combos, simplifying the user operation, reducing the number of identifications of the terminal device for the attitude operation, and reducing the processing overhead of the terminal device. The termination instruction may be an instruction generated by the client or received from the server. The termination instruction may be generated or obtained after certain duration immediately when the combo count reaches the threshold, may be correspondingly generated by identifying a termination attitude operation of the user, or may be generated or obtained after the target media content is closed.

Step 404: Display a first dynamic effect when the attribute information of the first attitude operation and attribute information of the last attitude operation correspond to different attribute levels.

The first dynamic effect is a dynamic effect corresponding to the first attribute level. That is, when the attribute level of the attitude operation changes (that is, the attribute level is upgraded), the corresponding dynamic effect is displayed. In this way, the user is prompted in the form of dynamic effects to change the attribute level of the attitude operation, thereby giving intuitive and explicit positive feedbacks to the user.

In some embodiments, step 404 includes the following steps:

1: Obtain a trigger position of the first attitude operation.
2: Determine a display position of the first dynamic effect according to the trigger position of the first attitude operation.
3: Display the first dynamic effect according to the display position of the first dynamic effect.

In this embodiment, position coordinates of the trigger position of the first attitude operation in the content presentation interface are determined, and coordinates of a display position of the first dynamic effect are determined according to the position coordinates or a display region of the first dynamic effect is determined. In some embodiments, the display position of the first dynamic effect is the same as the trigger position of the first attitude operation, or the display region of the first dynamic effect is a region centered on the trigger position of the first attitude operation.

In some embodiments, if the client obtains information that the user performs the first attitude operation with a right hand, the first dynamic effect is displayed to the left of the trigger position of the first attitude operation. If the client obtains information that the user performs the first attitude operation with a left hand, the first dynamic effect is displayed to the right of the trigger position of the first attitude operation, so as to minimize the occlusion of the display region of the first dynamic effect by the hand, whereby the user views the complete first dynamic effect, and the display integrity and effect of the first dynamic effect are better.

In some embodiments, the first dynamic effect includes at least one of GIF and an animation. In some embodiments, displaying the first dynamic effect includes displaying a motion trajectory of an image in the first dynamic effect.

In some embodiments, an operation frequency of attitude operations received during the display of the first dynamic effect is obtained, and a display effect of the first dynamic effect is adjusted according to the operation frequency. In some embodiments, the display effect includes at least one of the following: size, dither frequency, color, and brightness. Illustratively, the specific adjustment process of the display effect of the first dynamic effect is as follows:

(1) Adjust the Display Size of the First Dynamic Effect

During the display of the first dynamic effect, in response to the operation frequency falling within a first frequency range, the first dynamic effect is displayed according to a size corresponding to the first frequency range. During the display of the first dynamic effect, in response to the operation frequency falling within a second frequency range, the first dynamic effect is displayed according to a size corresponding to the second frequency range. When a lower limit value of the second frequency range is greater than an upper limit value of the first frequency range, the size corresponding to the second frequency range is greater than the size corresponding to the first frequency range.

(2) Adjust the Dither Frequency of the First Dynamic Effect

During the display of the first dynamic effect, the dither frequency of the first dynamic effect is determined according to the operation frequency. A first upgrade effect picture is displayed according to the dither frequency of the first dynamic effect. The dither frequency of the first dynamic effect has a positive correlation with the operation frequency.

(3) Adjust the Color of the First Dynamic Effect

During the display of the first dynamic effect, a color depth of the first dynamic effect is determined according to the operation frequency. The first dynamic effect is displayed according to the color depth of the first dynamic effect. The color depth of the first dynamic effect has a positive correlation with the operation frequency.

(4) Adjust the Brightness of the First Dynamic Effect

During the display of the first dynamic effect, the brightness of a target picture region in the first dynamic effect is determined according to the operation frequency. The first dynamic effect is displayed according to the brightness of the target picture region in the first dynamic effect. The brightness of the target picture region in the first dynamic effect has a positive correlation with the operation frequency. The target picture region may be some or all of picture regions in the first dynamic effect.

In this step, the display effects of the first dynamic effects corresponding to different operation frequencies may be different. As the operation frequency is higher, the display effect of the first dynamic effect is more obvious, so as to improve the willingness of the user to increase the operation frequency, thereby encouraging the user to participate in the interaction with the target media content more actively and improving the interest of the attitude operation.

Step 405: Transmit the attribute information of the first attitude operation to a server, the server being configured to determine the first attribute level corresponding to the attribute information of the first attitude operation, and to select a first feedback element from the material pool corresponding to the first attribute level.

In some embodiments, the server determines the attribute level corresponding to the attribute information of the first attitude operation, and the first feedback element corresponding to the first attitude operation. Therefore, the client needs to transmit the attribute information of the first attitude operation to the server.

Step 406: Receive identification information of the first feedback element from the server.

After step 405, the identification information of the first feedback element transmitted by the server is received. The identification information of the first feedback element may indicate a material pool corresponding to the first feedback element, a corresponding attribute level namely the first attribute level, a storage position of the first feedback element, and the like.

Step 407: Obtain the first feedback element according to the identification information of the first feedback element.

In some embodiments, the client may determine, according to the identification information of the first feedback element, that the feedback element corresponding to the first attitude operation is the first feedback element, and then obtain the stored first feedback element from a storage unit of the terminal.

Step 408: Obtain an interface element corresponding to a trigger position of the first attitude operation in the content presentation interface.

In some embodiments, the interface element is a pixel information/interface display content corresponding to the trigger position of the first attitude operation. In some embodiments, attribute information of the interface element is obtained. The attribute information of the interface element includes at least one of the following: color, brightness, and geometric features. The geometric features include line thickness, types of geometry, sizes of geometric patterns, and the like.

Step 409: Determine a display effect of the first feedback element according to the interface element.

In some embodiments, the display effect of the first feedback element is determined according to the attribute information of the interface element. For example, if the color of the interface element is light green, it is determined that the first feedback element is displayed as dark green. For another example, if the brightness of the interface element is relatively high, it is determined that the first feedback element is displayed at a lower brightness. For another example, if the interface element includes multiple wave points, the first feedback element is displayed in a pattern composed of the multiple wave points.

Step 410: Display the first feedback element according to the display effect of the first feedback element.

In some embodiments, the first feedback element is displayed according to the color, brightness, and geometric features of the first feedback element determined in step 409.

In some embodiments, the method further includes the following steps:

1: Determine whether an operation body corresponding to the first attitude operation is a right hand or a left hand.

2: Display the first feedback element in a left region of the content presentation interface when the operation body corresponding to the first attitude operation is the right hand.

3: Display the first feedback element in a right region of the content presentation interface when the operation body corresponding to the first attitude operation is the left hand.

In the foregoing embodiments, the left region may refer to a left half region of the content presentation interface, or may refer to a left ⅓ region of the content presentation interface. The proportion of the left region in the content presentation interface may be set specifically by a person skilled in the art according to actual situations. This embodiment of this application is not specifically limited thereto. The right region may refer to a left half region of the content presentation interface, or may refer to a right ⅓ region of the content presentation interface. The proportion of the right region in the content presentation interface may be set specifically by a person skilled in the art according to actual situations. This embodiment of this application is not specifically limited thereto.

In the foregoing embodiments, the display region of the first feedback element is determined by identifying whether the user performs the attitude operation with the left hand or the right hand, thereby minimizing the occlusion of the first feedback element by the hand.

In summary, according to the technical solutions provided in this embodiment of this application, display effects of first dynamic effects corresponding to different operation frequencies may be different. As the operation frequency is higher, the display effect of the first dynamic effect is more obvious, so as to improve the willingness of a user to increase the operation frequency, thereby encouraging the user to participate in the interaction with a target media content more actively and improving the interest of an attitude operation.

Figure 5:
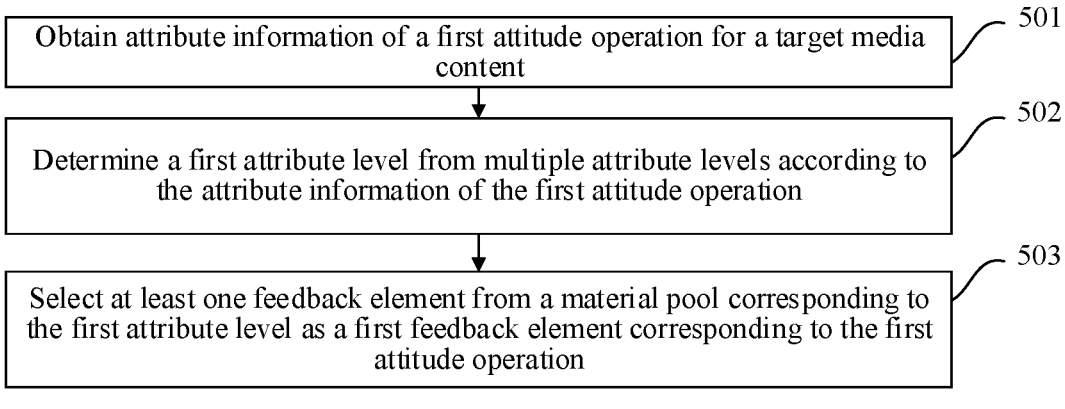
FIG. 5 is a flowchart of an element selection method according to an embodiment of this application.

FIG. 5 shows a flowchart of an element selection method according to an embodiment of this application. In this embodiment, the method may be performed by the client described above, or performed by the server described above, or performed interactively by the client and the server. The method may include the following steps (501-503):

Step 501: Obtain attribute information of a first attitude operation for a target media content.

In some embodiments, if the step is performed by the server, the server receives attribute information of the first attitude operation for the target media content transmitted by the client.

Step 502: Determine a first attribute level from multiple attribute levels according to the attribute information of the first attitude operation.

In some embodiments, the first attribute level refers to an attribute level corresponding to the attribute information of the first attitude operation. In some embodiments, different attribute levels correspond to different material pools. The material pool includes at least one feedback element.

In some embodiments, the material pool refers to a set of at least one feedback element, or a set of identifiers of at least one feedback element. Different material pools may be located in different storage directories, or in identifiers of feedback elements in the same material pool. The same identifier field is present for distinguishing from feedback elements in other material pools.

In some embodiments, the terminal or the server stores correspondences between the attribute information and the attribute levels. By invoking the correspondences, the first attribute level corresponding to the attribute information of the first attitude operation may be determined from the multiple attribute levels.

Step 503: Select at least one feedback element from a material pool corresponding to the first attribute level as a first feedback element corresponding to the first attitude operation.

In some embodiments, the first feedback element is used for displaying after receiving the first attitude operation.

In some embodiments, based on the attribute information of the first attitude operation, the attribute level corresponding to the first attitude operation may be determined as the first attribute level, and then the material pool corresponding to the first attitude operation may be determined as the material pool corresponding to the first attribute level.

In some embodiments, after determining the material pool corresponding to the first attribute level, at least one feedback element is randomly selected from the material pool as the first feedback element by a random number generator (or random number model).

In some embodiments, after determining the material pool corresponding to the first attribute level, the first feedback element is selected from the material pool in a certain order. For example, the material pool includes the following feedback elements arranged in an order: feedback element 1, feedback element 2, feedback element 3, and a feedback element 4. Usage information of an element in the material pool is obtained, and if it is determined that a feedback element used last in the material pool is feedback element 2 before the first attitude operation, a feedback element (namely, feedback element 3) following feedback element 2 is determined as the first feedback element corresponding to the first attitude operation. If it is determined that the feedback element used last in the material pool is feedback element 4 before the first attitude operation, a feedback element (namely, feedback element 1) following feedback element 4 is determined as the first feedback element corresponding to the first attitude operation.

The explanation of some concepts in this embodiment may be similar to the embodiment of FIG. 3.

In summary, according to the technical solutions provided in this embodiment of this application, corresponding attribute levels are determined according to attribute information of attitude operations, and selected feedback elements corresponding to different attribute levels are different, so as to improve the display richness of the feedback elements.

Figure 6:
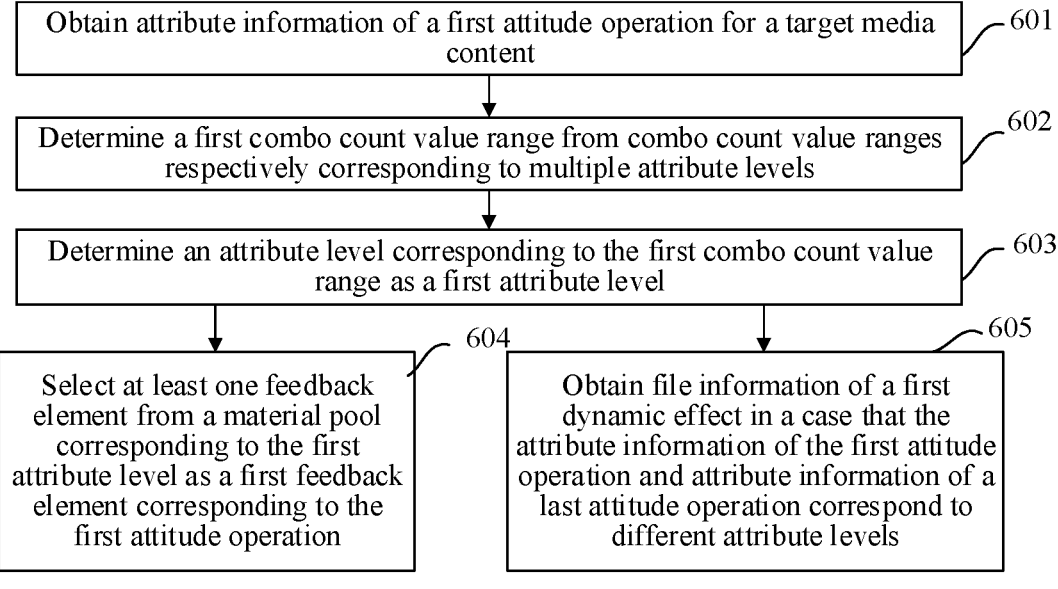
FIG. 6 is a flowchart of an element selection method according to another embodiment of this application.

FIG. 6 shows a flowchart of an element selection method according to another embodiment of this application. In this embodiment, the method may be performed by the client described above, or performed by the server described above, or performed interactively by the client and the server. The method may include the following steps (601-605):

Step 601: Obtain attribute information of a first attitude operation for a target media content.

Step 601 is identical or similar to step 501 in the embodiment of FIG. 5, and is not described herein again.

In some embodiments, the attribute information includes a combo count. Different attribute levels correspond to different combo count value ranges. Illustratively, the combo count within a range of 1-10 corresponds to attribute level 1. The combo count within a range of 11-20 corresponds to attribute level 2. The combo count within a range of 21-30 corresponds to attribute level 3. The combo count greater than 30 corresponds to attribute level 4.

Step 602: Determine a first combo count value range from combo count value ranges respectively corresponding to multiple attribute levels.

The first combo count value range refers to a combo count value range within which a combo count of the first attitude operation falls. In some embodiments, the combo count of the first attitude operation is matched with the combo count value ranges respectively corresponding to the multiple attribute levels, so as to determine the combo count value ranges respectively corresponding to the multiple attribute levels.

Based on the example in step 601, illustratively, if the combo count of the first attitude operation is 5, the first combo count value range is 1-10. If the combo count of the first attitude operation is 35, the first combo count value range is greater than 30.

Step 603: Determine an attribute level corresponding to the first combo count value range as a first attribute level.

Illustratively, based on the examples in step 601 and step 602, if the first combo count value range is 1-10, the first attribute level is attribute level 1. If the first combo count value range is greater than 30, the first attribute level is attribute level 4.

Step 604: Select at least one feedback element from a material pool corresponding to the first attribute level as a first feedback element corresponding to the first attitude operation.

Step 604 is identical or similar to step 503 in the embodiment of FIG. 5, and is not described herein again.

Step 605: Obtain file information of a first dynamic effect when the attribute information of the first attitude operation and attribute information of a last attitude operation correspond to different attribute levels.

The first dynamic effect is a dynamic effect corresponding to the first attribute level. In some embodiments, if the attribute information of the first attitude operation and the attribute information of the last attitude operation correspond to different attribute levels, it indicates that the attribute information of the attitude operation is upgraded and the first dynamic effect for representing upgrade needs to be displayed. Then, the file information of the first dynamic effect needs to be obtained. In some embodiments, the file information of the first dynamic effect refers to a program file required to display the first dynamic effect. If this step is performed by the client, the first dynamic effect is displayed directly based on the file information of the first dynamic effect. If this step is performed by the server, the file information of the first dynamic effect is transmitted to the client, whereby the client displays the first dynamic effect based on the file information of the first dynamic effect.

Step 605 may or may not be performed. This embodiment of this application is not specifically limited thereto. Step 604 and step 605 are not sequentially performed. Step 604 may be first performed and then step 605 is performed, or step 605 may be first performed and then step 604 is performed.

The explanation of some concepts in this embodiment may be similar to the embodiments of FIG. 3 and FIG. 4.

In summary, according to the technical solutions provided in this embodiment of this application, a feedback element is randomly selected from a material pool corresponding to a first attribute level as a first feedback element corresponding to a first attitude operation, thereby improving the randomness of the displayed feedback element corresponding to the attitude operation, and further improving the display richness and flexibility of the feedback element.

In a possible implementation, the method further includes the following steps:

1: Obtain an attitude operation total of the target media content within a first time period.

2: Determine a first total level from multiple total levels according to the attitude operation total within the first time period, the first total level referring to a total level corresponding to the attitude operation total within the first time period.

3: Determine the number of common feedback elements as a target number according to the first total level.

4: Select the target number of common feedback elements from a common material pool, the target number of common feedback elements being used for displaying during the display of the target media content.

In some embodiments, the attitude operation total within the first time period refers to a total of attitude operations performed on the target media content within the first time period by at least one client. For example, a thumbs-up total within the first time period refers to a total of thumbs-up operations (thumbs-up) performed on the target media content within the first time period by at least one client. As described above, a total number of attitude operations is not necessarily equal to a total number of combos corresponding to the attitude operations. In some embodiments, the attitude operation total refers to a total number of attitude operations within the first time period. In some embodiments, the attitude operation total refers to a total number of combos corresponding to the attitude operations within the first time period.

In some embodiments, the server statistically determines the attitude operation total of the target media content within the first time period, determines a first total level according to correspondences between the attitude operation total and total levels, determines the number of common feedback elements corresponding to the first total level as a target number, and displays the target number of common feedback elements. In some embodiments, the target number has a positive correlation with the attitude operation total.

In the foregoing implementations, as the attitude operation total is larger, more common feedback elements are displayed, whereby the popularity of the target media content may be intuitively and conveniently understood through the target number of common feedback elements.

The element display method provided in this embodiment of this application is exemplarily described below with reference to FIG. 7.

Figure 7:
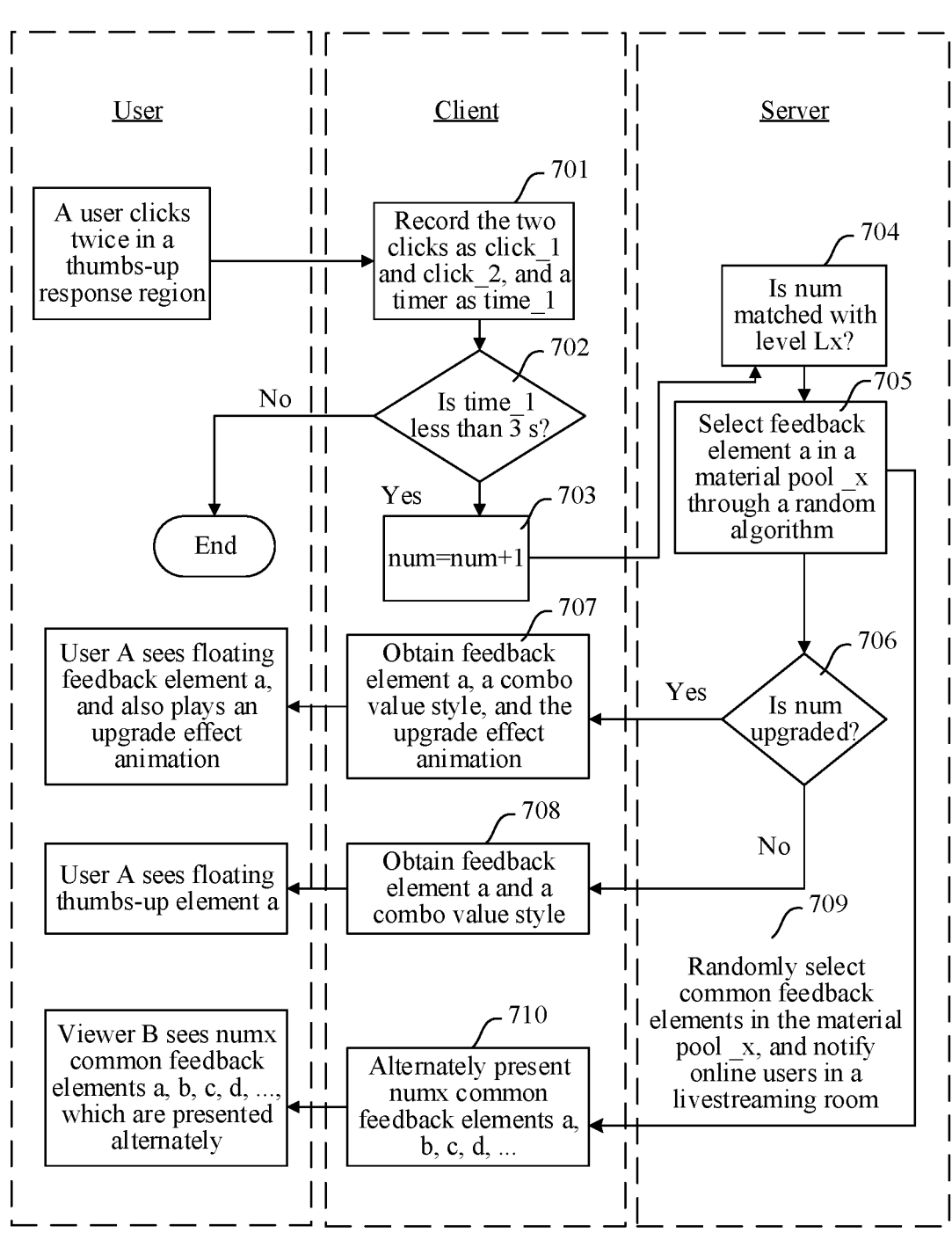
FIG. 7 is a flowchart of an element display method according to another embodiment of this application.

FIG. 7 shows a flowchart of an element display method according to another embodiment of this application. The method may be applied to the element display system described above. In an example where an attitude operation is a thumbs-up operation, the method may include the following steps (701-710):

Step 701: A client identifies two click operations of a user in a thumbs-up response region of a content presentation interface, and records the two click operations as click_1 and click_2 respectively according to a time sequence, where click_1 is earlier than click_2. Click positions of click_1 and click_2 are recorded as position_1 and position_2, and the client starts a timer to begin timing when click_1 is identified. After click_2 is identified, if the timer for click_1 has not ended, the timer is automatically ended, and time is recorded as time_1.

In some embodiments, the timer will be automatically ended when the time reaches 4 s. The content presentation interface is used for displaying a target media content in a target livestreaming room.

Step 702: The client determines whether time_1 is less than or equal to 3 s. If yes, step 703 is performed. If no, the step is ended.

Step 703: Set a combo count num to be equal to num+1, and transmit num to a server.

Step 704: The server determines a corresponding attribute level Lx according to num.

Step 705: The server determines a corresponding material pool x by query according to Lx, the material pool including numbered feedback elements. Feedback element a with a random sequence number is selected in x according to a random algorithm, and a link corresponding to feedback element a is generated. Then step 706 and step 709 are performed.

Step 706: Determine whether num is a first value in a Vx level range. If yes, a configured dynamic effect file pag_1 is queried according to Lx, and step 707 is performed. If no, step 708 is performed.

Step 707: The client receives the link corresponding to feedback element a and pag_1 from the server, downloads feedback element a, and displays feedback element a and pag_1 at position_2.

Step 708: The client receives the link corresponding to feedback element a from the server, downloads feedback element a, and displays feedback element a at position_2.

Step 709: The server calculates, every 5 s, a thumbs-up total num x triggered by different users in the target livestreaming room within 5 s, calculates a target number numx of common feedback elements hit by consecutive attitude operations at different levels Lx, and obtains numx random common feedback elements a, b, c, d, . . . within the material pool of Lx through the random algorithm.

Step 710: The server determines current online user IDs in the target livestreaming room, and respectively transmits the current online user IDs to at least one corresponding client. After obtaining numx common feedback elements, the client alternately presents the numx common feedback elements a, b, c, d, . . . in a lower right region of a content presentation interface of the client.

The following describes apparatus embodiments of this application, which may be used for executing the method embodiments of this application. Details not disclosed in the apparatus embodiments of this application may be similar to those in the method embodiments of this application.

Figure 8:
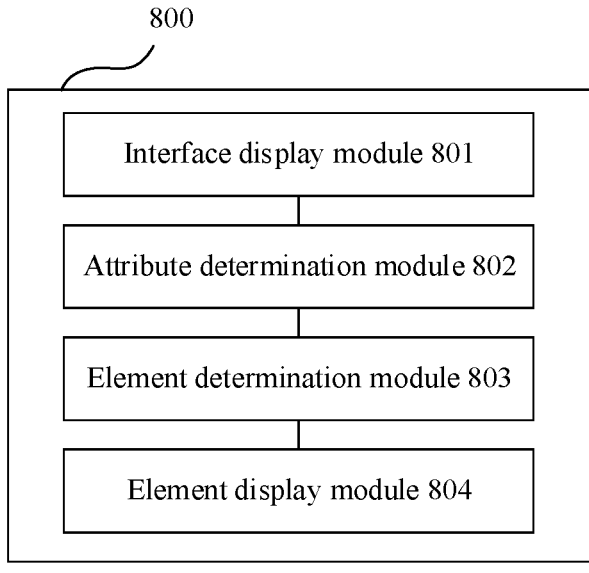
FIG. 8 is a block diagram of an element display apparatus according to an embodiment of this application.

FIG. 8 shows a block diagram of an element display apparatus according to an embodiment of this application. The apparatus has a function of implementing the foregoing element display method examples. The function may be implemented by hardware or may be implemented by hardware executing corresponding software. The device may be a terminal device as described above or may be disposed on the terminal device. The apparatus 800 may include: an interface display module 801, an attribute determination module 802, an element determination module 803, and an element display module 804.

The interface display module 801 is configured to display a content presentation interface. A target media content is displayed in the content presentation interface.

The attribute determination module 802 is configured to determine, in response to a first attitude operation for the target media content, attribute information of the first attitude operation. Different attribute levels correspond to different material pools. The material pool includes at least one feedback element.

The element determination module 803 is configured to obtain, based on the attribute information of the first attitude operation, a first feedback element corresponding to the first attitude operation. The first feedback element includes at least one feedback element selected from a material pool corresponding to a first attribute level. The first attribute level refers to an attribute level corresponding to the attribute information of the first attitude operation.

The element display module 804 is configured to display the first feedback element.

Figure 9:
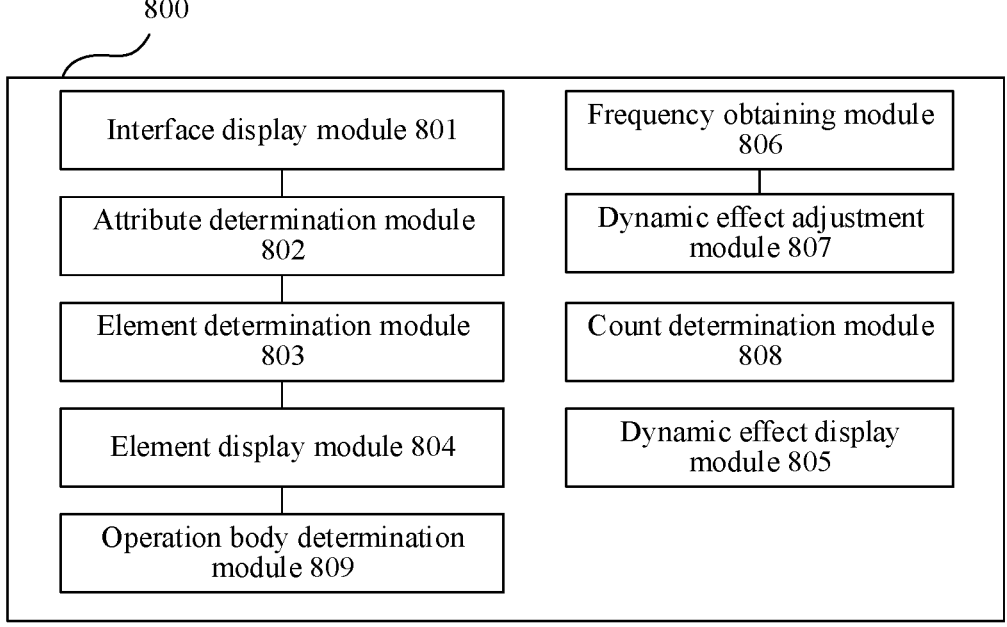
FIG. 9 is a block diagram of an element display apparatus according to another embodiment of this application.

In an exemplary embodiment, as shown in FIG. 9, the apparatus 800 further includes: a dynamic effect display module 805.

The dynamic effect display module 805 is configured to display a first dynamic effect when the attribute information of the first attitude operation and attribute information of a last attitude operation correspond to different attribute levels. The first dynamic effect is a dynamic effect corresponding to the first attribute level.

In an exemplary embodiment, the dynamic effect display module 805 is configured to: obtain a trigger position of the first attitude operation; determine a display position of the first dynamic effect according to the trigger position of the first attitude operation; and display the first dynamic effect according to the display position of the first dynamic effect.

In an exemplary embodiment, as shown in FIG. 9, the apparatus 800 further includes: a frequency obtaining module 806 and a dynamic effect adjustment module 807.

The frequency obtaining module 806 is configured to obtain an operation frequency of attitude operations received during the display of the first dynamic effect.

The dynamic effect adjustment module 807 is configured to adjust a display effect of the first dynamic effect according to the operation frequency. The display effect includes at least one of the following: size, dither frequency, color, and brightness.

In an exemplary embodiment, the element determination module 803 is configured to: transmit the attribute information of the first attitude operation to a server, the server being configured to determine the first attribute level corresponding to the attribute information of the first attitude operation, and to select the first feedback element from the material pool corresponding to the first attribute level; receive identification information of the first feedback element from the server; and obtain the first feedback element according to the identification information of the first feedback element.

In an exemplary embodiment, the element display module 804 is configured to: obtain an interface element corresponding to a trigger position of the first attitude operation in the content presentation interface; determine a display effect of the first feedback element according to the interface element; and display the first feedback element according to the display effect of the first feedback element.

In an exemplary embodiment, the attribute information includes a combo count. As shown in FIG. 9, the apparatus 800 further includes: a count determination module 808.

The count determination module 808 is configured to: determine, in response to a second attitude operation for the target media content, a combo count of the second attitude operation according to a target increment when a combo count of the first attitude operation is greater than or equal to a threshold, the target increment being greater than a default increment of attitude operations; or, automatically increase, when a combo count of the first attitude operation is greater than or equal to a threshold, the combo count, and stop automatically increasing the combo count upon generation or obtaining of a termination instruction.

In an exemplary embodiment, as shown in FIG. 9, the apparatus 800 further includes: an operation body determination module 809.

The operation body determination module 809 is configured to determine whether an operation body corresponding to the first attitude operation is a right hand or a left hand.

The element display module 804 is further configured to: display the first feedback element in a left region of the content presentation interface when the operation body corresponding to the first attitude operation is the right hand; and display the first feedback element in a right region of the content presentation interface when the operation body corresponding to the first attitude operation is the left hand.

In an exemplary embodiment, the element display module 804 is further configured to display a target number of common feedback elements during the display of the target media content. The target number of common feedback elements are selected from a common material pool according to an attitude operation total of the target media content within a first time period.

In summary, according to the technical solutions provided in this embodiment of this application, after a first attitude operation is identified when a target media content is displayed, an attribute level of the first attitude operation is determined to be a first attribute level, and a feedback element corresponding to the first attitude operation is selected from a material pool corresponding to the first attribute level and displayed. That is, displayed feedback elements corresponding to attitude operations of different attribute levels are different, so as to improve the display richness of the feedback elements.

Figure 10:
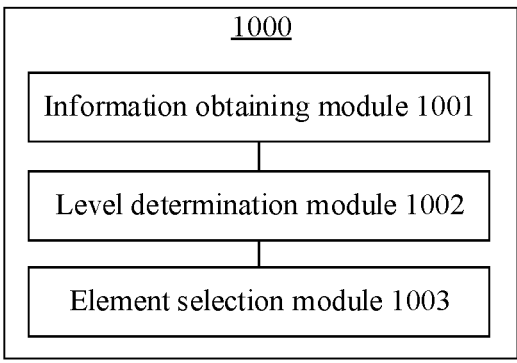
FIG. 10 is a block diagram of an element selection apparatus according to an embodiment of this application.

FIG. 10 shows a block diagram of an element selection apparatus according to an embodiment of this application. The apparatus has a function of implementing the foregoing element selection method examples. The function may be implemented by hardware or may be implemented by hardware executing corresponding software. The device may be a computer device as described above (such as a terminal device or a server) or may be disposed on the computer device. The apparatus 1000 may include: an information obtaining module 1001, a level determination module 1002, and an element selection module 1003.

The information obtaining module 1001 is configured to obtain attribute information of a first attitude operation for a target media content.

The level determination module 1002 is configured to determine a first attribute level from multiple attribute levels according to the attribute information of the first attitude operation. The first attribute level refers to an attribute level corresponding to the attribute information of the first attitude operation. Different attribute levels correspond to different material pools. The material pool includes at least one feedback element.

The element selection module 1003 is configured to select at least one feedback element from a material pool corresponding to the first attribute level as a first feedback element corresponding to the first attitude operation. The first feedback element is used for displaying after receiving the first attitude operation.

In an exemplary embodiment, the attribute information includes a combo count. Different attribute levels correspond to different combo count value ranges. The level determination module 1002 is configured to: determine a first combo count value range from the combo count value ranges respectively corresponding to the multiple attribute levels, the first combo count value range referring to a combo count value range within which the combo count of the first attitude operation falls; and determine an attribute level corresponding to the first combo count value range as the first attribute level.

Figure 11:
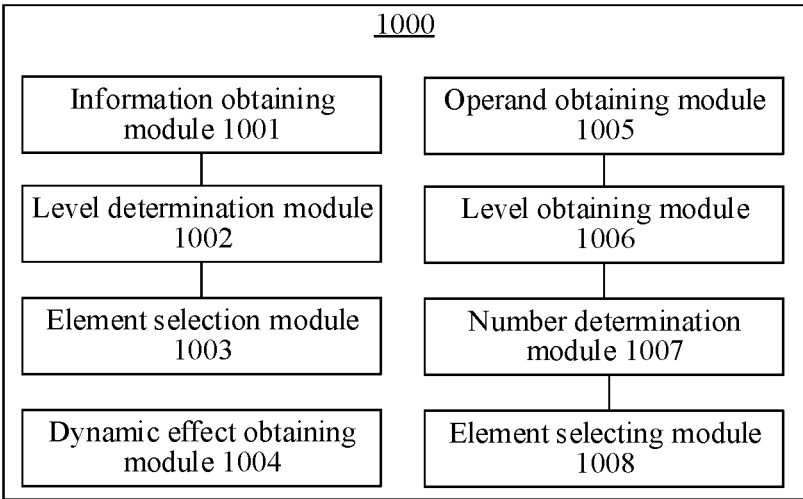
FIG. 11 is a block diagram of an element selection apparatus according to another embodiment of this application.

In an exemplary embodiment, as shown in FIG. 11, the apparatus 1000 further includes: a dynamic effect obtaining module 1004.

The dynamic effect obtaining module 1004 is configured to obtain file information of a first dynamic effect when the attribute information of the first attitude operation and attribute information of a last attitude operation correspond to different attribute levels. The first dynamic effect is a dynamic effect corresponding to the first attribute level.

In an exemplary embodiment, as shown in FIG. 11, the apparatus 1000 further includes: an operand obtaining module 1005, a level obtaining module 1006, a number determination module 1007, and an element selecting module 1008.

The operand obtaining module 1005 is configured to obtain an attitude operation total of the target media content within a first time period.

The level obtaining module 1006 is configured to determine a first total level from multiple total levels according to the attitude operation total within the first time period. The first total level refers to a total level corresponding to the attitude operation total within the first time period.

The number determination module 1007 is configured to determine the number of common feedback elements as a target number according to the first total level.

The element selecting module 1008 is configured to select the target number of common feedback elements from a common material pool. The target number of common feedback elements is used for displaying during the display of the target media content.

In summary, according to the technical solutions provided in this embodiment of this application, corresponding attribute levels are determined according to attribute information of attitude operations, and selected feedback elements corresponding to different attribute levels are different, so as to improve the display richness of the feedback elements.

The apparatus provided in the foregoing embodiments is illustrated with an example of division of the foregoing function modules during the implementation of the functions thereof. In practical application, the foregoing functions may be allocated to and completed by different function modules according to requirements. That is, the internal structure of the device is divided into different function modules, so as to complete all or part of the functions described above. In addition, the apparatus provided in the foregoing embodiments and the method embodiments fall within the same conception. A specific implementation process is described in detail with reference to the method embodiments and will not be repeated herein.

Figure 12:
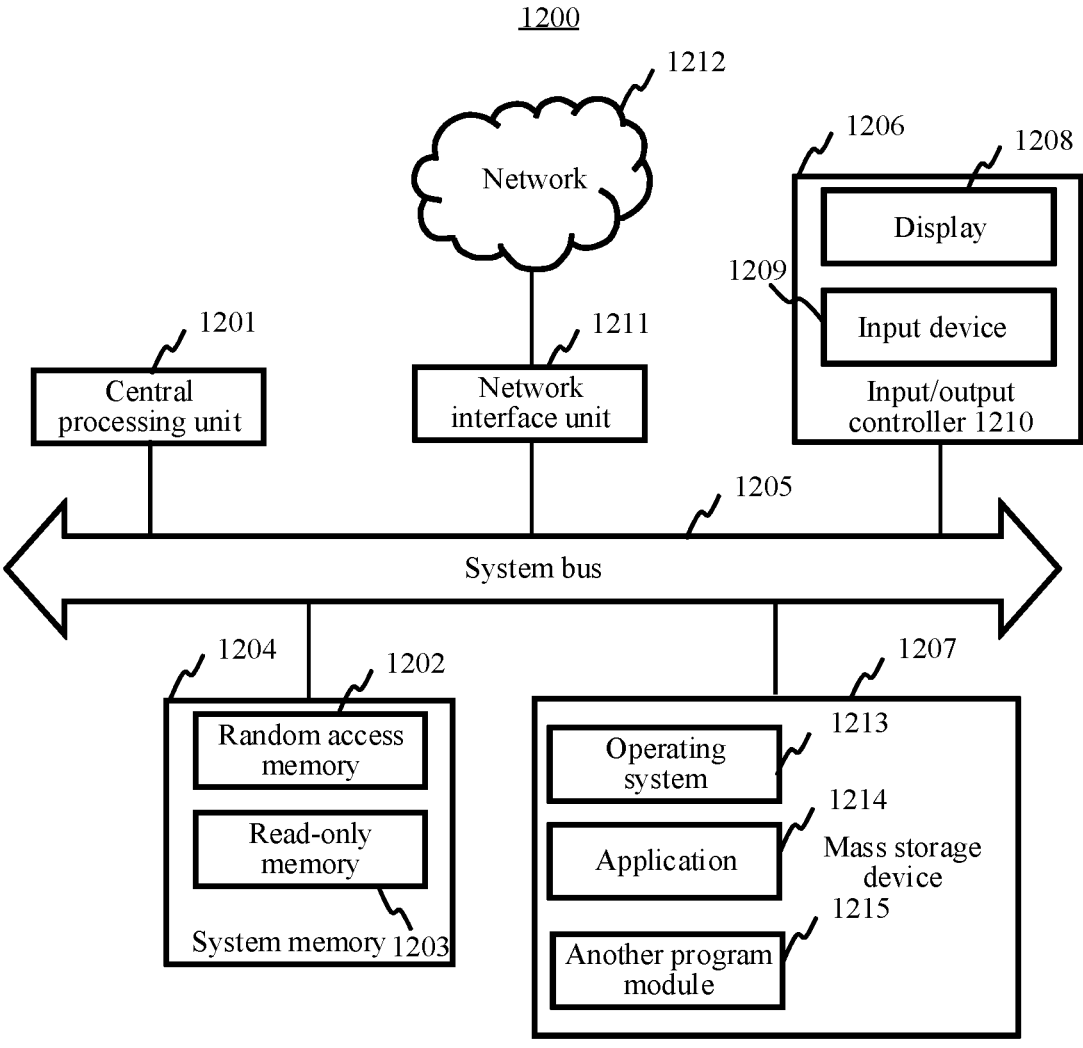
FIG. 12 is a block diagram of a computer device according to an embodiment of this application.

FIG. 12 shows a structural block diagram of a computer device according to an embodiment of this application. The computer device may be a terminal device or a server. The computer device is configured to implement the element display method or the element selection method provided in the foregoing embodiments. Specifically:

The computer device 1200 includes a central processing unit (CPU) 1201, a system memory 1204 including a random access memory (RAM) 1202 and a read-only memory (ROM) 1203, and a system bus 1205 connecting the system memory 1204 and the CPU 1201. The computer device 1200 further includes a basic input/output (I/O) system 1206 that facilitates transfer of information between elements within a computer, and a mass storage device 1207 that stores an operating system 1213, an application 1214, and another program module 1215.

The basic I/O system 1206 includes a display 1208 for displaying information and an input device 1209 such as a mouse or a keyboard for inputting information by a user. The display 1208 and the input device 1209 are connected to the CPU 1201 through an I/O controller 1210 which is connected to the system bus 1205. The basic I/O system 1206 may further include the I/O controller 1210 for receiving and processing input from multiple other devices, such as a keyboard, a mouse, or an electronic stylus. Similarly, the I/O controller 1210 also provides output to a display screen, a printer, or another type of output device.

The mass storage device 1207 is connected to the CPU 1201 through a mass storage controller (not shown) connected to the system bus 1205. The mass storage device 1207 and a non-transitory computer-readable medium associated therewith provide non-volatile storage for the computer device 1200. That is, the mass storage device 1207 may include a computer-readable medium (not shown) such as a hard disk or a compact disc read-only memory (CD-ROM) drive.

In general, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable read only memory (EPROM), an electrically erasable programmable read only memory (EEPROM), a flash memory or another solid-state memory technology, a CD-ROM, a digital video disc (DVD) or another optical memory, a tape cartridge, a magnetic tape, a magnetic disk memory, or another magnetic storage device. Certainly, a person skilled in the art may learn that the computer storage medium is not limited to the foregoing several types. The foregoing system memory 1204 and mass storage device 1207 may be collectively referred to as a memory.

According to the embodiments of this application, the computer device 1200 may further be connected, through a network such as the Internet, to a remote computer on the network and run. That is, the computer device 1200 may be connected to a network 1212 through a network interface unit 1211 which is connected to the system bus 1205, or may be connected to another type of network or remote computer system (not shown) by using the network interface unit 1211.

In some embodiments, when the computer device is a terminal device, the computer device includes a processor and a memory. The memory stores a computer program. The computer program is loaded and executed by the processor to implement the foregoing element display method.

In some embodiments, when the computer device is a terminal device or a server, the computer device or the server includes a processor and a memory. The memory stores a computer program. The computer program is loaded and executed by the processor to implement the foregoing element selection method.

In an exemplary embodiment, a non-transitory computer-readable storage medium is also provided. The storage medium stores a computer program. The computer program, when executed by a processor, implements the foregoing element display method.

In an exemplary embodiment, a computer-readable storage medium is also provided. The storage medium stores a computer program. The computer program, when executed by a processor, implements the foregoing element selection method.

In some embodiments, the computer-readable storage medium may include: a ROM, a RAM, a solid state drive (SSD), an optical disc, or the like. The RAM may include a resistance random access memory (ReRAM) and a dynamic random access memory (DRAM).

In an exemplary embodiment, a computer program product is also provided. The computer program product includes a computer program. The computer program is stored in a computer-readable storage medium. A processor of a computer device reads the computer program from the computer-readable storage medium. The processor executes the computer program, whereby the computer device performs the foregoing element display method.

In an exemplary embodiment, a computer program product is also provided. The computer program product includes a computer program. The computer program is stored in a computer-readable storage medium. A processor of a computer device reads the computer program from the computer-readable storage medium. The processor executes the computer program, whereby the computer device performs the foregoing element selection method.

It is to be understood that "multiple" mentioned in the specification means two or more. "And/or" describes an association relationship between associated objects, and represents that three relationships may exist. For example, A and/or B may represent the following three cases: Only A exists, both A and B exist, and only B exists. The character "/" generally represents that contextual objects are in an "or" relationship.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for displaying a feedback element performed by a computer device, the method comprising:

displaying a content presentation interface, the content presentation interface including a target media content;

determining a number of times that a user of the computer device repeats a predefined operation on the target media content within a predefined time interval as a combo count of a first attitude operation for the target media content performed by the user of the computer device;

determining attribute information of the first attitude operation based on the combo count of the first attitude operation for the target media content performed by the user of the computer device;

based on the attribute information of the first attitude operation, obtaining a first feedback element corresponding to the first attitude operation, the first feedback element comprising at least one feedback element selected, in an order, from a material pool corresponding to a first attribute level, wherein the first feedback element is a feedback element immediately following a last used feedback element in the material pool before the first attitude operation, and the first attribute level refers to an attribute level corresponding to the attribute information of the first attitude operation; and displaying the first feedback element, wherein different feedback elements corresponding to attitude operations of different attribute levels are displayed differently.

2. The method according to claim 1, wherein after the determining attribute information of the first attitude operation, the method further comprises:

displaying a first dynamic effect corresponding to the first attribute level when the attribute information of the first attitude operation and attribute information of a last attitude operation correspond to different attribute levels.

3. The method according to claim 1, wherein the obtaining a first feedback element corresponding to the first attitude operation comprises:

transmitting the attribute information of the first attitude operation to a server, the server being configured to determine the first attribute level corresponding to the attribute information of the first attitude operation, and to select the first feedback element from the material pool corresponding to the first attribute level;

receiving identification information of the first feedback element from the server; and obtaining the first feedback element according to the identification information of the first feedback element.

4. The method according to claim 1, wherein the displaying the first feedback element comprises:

obtaining an interface element corresponding to a trigger position of the first attitude operation in the content presentation interface;

determining a display effect of the first feedback element according to the interface element; and displaying the first feedback element according to the display effect of the first feedback element.

5. The method according to claim 1, wherein after the determining attribute information of the first attitude operation, the method further comprises:

automatically increasing, when the combo count of the first attitude operation is greater than or equal to a threshold, the combo count, and stopping automatically increasing the combo count upon generation or obtaining of a termination instruction.

6. The method according to claim 1, further comprising:

determining whether an operation body corresponding to the first attitude operation is a right hand or a left hand;

displaying the first feedback element in a left region of the content presentation interface when the operation body corresponding to the first attitude operation is the right hand; and displaying the first feedback element in a right region of the content presentation interface when the operation body corresponding to the first attitude operation is the left hand.

7. The method according to claim 1, further comprising:

selecting a target number of common feedback elements from a common material pool according to an attitude operation total of the target media content within a first time period; and displaying the target number of common feedback elements during the display of the target media content.

8. A computer device, comprising a processor and a memory, the memory storing a computer program, and the computer program being loaded and executed by the processor and causing the computer device to implement a method for displaying a feedback element, the method including:

displaying a content presentation interface, the content presentation interface including a target media content;

determining a number of times that a user of the computer device repeats a predefined operation on the target media content within a predefined time interval as a combo count of a first attitude operation for the target media content performed by the user of the computer device;

determining attribute information of the first attitude operation based on the combo count of the first attitude operation for the target media content performed by the user of the computer device;

based on the attribute information of the first attitude operation, obtaining a first feedback element corresponding to the first attitude operation, the first feedback element comprising at least one feedback element selected, in an order, from a material pool corresponding to a first attribute level, wherein the first feedback element is a feedback element immediately following a last used feedback element in the material pool before the first attitude operation, and the first attribute level refers to an attribute level corresponding to the attribute information of the first attitude operation; and displaying the first feedback element, wherein different feedback elements corresponding to attitude operations of different attribute levels are displayed differently.

9. The computer device according to claim 8, wherein, after the determining attribute information of the first attitude operation, the method further comprises:

displaying a first dynamic effect corresponding to the first attribute level when the attribute information of the first attitude operation and attribute information of a last attitude operation correspond to different attribute levels.

10. The computer device according to claim 8, wherein the obtaining a first feedback element corresponding to the first attitude operation comprises:

transmitting the attribute information of the first attitude operation to a server, the server being configured to determine the first attribute level corresponding to the attribute information of the first attitude operation, and to select the first feedback element from the material pool corresponding to the first attribute level;

receiving identification information of the first feedback element from the server; and obtaining the first feedback element according to the identification information of the first feedback element.

11. The computer device according to claim 8, wherein the displaying the first feedback element comprises:

obtaining an interface element corresponding to a trigger position of the first attitude operation in the content presentation interface;

determining a display effect of the first feedback element according to the interface element; and displaying the first feedback element according to the display effect of the first feedback element.

12. The computer device according to claim 8, wherein after the determining attribute information of the first attitude operation, the method further comprises:

automatically increasing, when the combo count of the first attitude operation is greater than or equal to a threshold, the combo count, and stopping automatically increasing the combo count upon generation or obtaining of a termination instruction.

13. The computer device according to claim 8, wherein the method further comprises:

determining whether an operation body corresponding to the first attitude operation is a right hand or a left hand;

displaying the first feedback element in a left region of the content presentation interface when the operation body corresponding to the first attitude operation is the right hand; and displaying the first feedback element in a right region of the content presentation interface when the operation body corresponding to the first attitude operation is the left hand.

14. The computer device according to claim 8, wherein the method further comprises:

selecting a target number of common feedback elements from a common material pool according to an attitude operation total of the target media content within a first time period; and displaying the target number of common feedback elements during the display of the target media content.

15. A non-transitory computer-readable storage medium, storing a computer program, and the computer program being loaded and executed by a processor of a computer device and causing the computer device to implement a method for displaying a feedback element, the method including:

displaying a content presentation interface, the content presentation interface including a target media content;

determining a number of times that a user of the computer device repeats a predefined operation on the target media content within a predefined time interval as a combo count of a first attitude operation for the target media content performed by the user of the computer device;

determining attribute information of the first attitude operation based on the combo count of the first attitude operation for the target media content performed by the user of the computer device;

based on the attribute information of the first attitude operation, obtaining a first feedback element corresponding to the first attitude operation, the first feedback element comprising at least one feedback element selected, in an order, from a material pool corresponding to a first attribute level, wherein the first feedback element is a feedback element immediately following a last used feedback element in the material pool before the first attitude operation, and the first attribute level refers to an attribute level corresponding to the attribute information of the first attitude operation; and displaying the first feedback element, wherein different feedback elements corresponding to attitude operations of different attribute levels are displayed differently.

16. The non-transitory computer-readable storage medium according to claim 15, wherein, after the determining attribute information of the first attitude operation, the method further comprises:

displaying a first dynamic effect corresponding to the first attribute level when the attribute information of the first attitude operation and attribute information of a last attitude operation correspond to different attribute levels.

17. The non-transitory computer-readable storage medium according to claim 15, wherein the method further comprises:

determining whether an operation body corresponding to the first attitude operation is a right hand or a left hand;

displaying the first feedback element in a left region of the content presentation interface when the operation body corresponding to the first attitude operation is the right hand; and displaying the first feedback element in a right region of the content presentation interface when the operation body corresponding to the first attitude operation is the left hand.

18. The non-transitory computer-readable storage medium according to claim 15, wherein the obtaining a first feedback element corresponding to the first attitude operation comprises:

transmitting the attribute information of the first attitude operation to a server, the server being configured to determine the first attribute level corresponding to the attribute information of the first attitude operation, and to select the first feedback element from the material pool corresponding to the first attribute level;

receiving identification information of the first feedback element from the server; and obtaining the first feedback element according to the identification information of the first feedback element.

19. The non-transitory computer-readable storage medium according to claim 15, wherein the displaying the first feedback element comprises:

obtaining an interface element corresponding to a trigger position of the first attitude operation in the content presentation interface;

determining a display effect of the first feedback element according to the interface element; and displaying the first feedback element according to the display effect of the first feedback element.

20. The non-transitory computer-readable storage medium according to claim 15, wherein, after the determining attribute information of the first attitude operation, the method further comprises:

automatically increasing, when the combo count of the first attitude operation is greater than or equal to a threshold, the combo count, and stopping automatically increasing the combo count upon generation or obtaining of a termination instruction.

* * * * *